United States Patent
Zhang et al.

(10) Patent No.: US 10,476,364 B2
(45) Date of Patent: Nov. 12, 2019

(54) MAGNET ASSEMBLY MOUNTING ARRANGEMENT FOR AN ELECTROMAGNETIC MOTOR

(71) Applicant: ASM Technology Singapore Pte Ltd, Singapore (SG)

(72) Inventors: Yue Zhang, Singapore (SG); Weihuan Luo, Singapore (SG); Libang Zeng, Singapore (SG)

(73) Assignee: ASM TECHNOLOGY SINGAPORE PTE LTD, Singapore (SG)

( * ) Notice: Subject to any disclaimer, the term of this patent is extended or adjusted under 35 U.S.C. 154(b) by 660 days.

(21) Appl. No.: 15/183,497

(22) Filed: Jun. 15, 2016

(65) Prior Publication Data

US 2017/0366078 A1 Dec. 21, 2017

(51) Int. Cl.
*H02K 41/02* (2006.01)
*H02K 1/00* (2006.01)

(52) U.S. Cl.
CPC .............. *H02K 41/02* (2013.01); *H02K 1/00* (2013.01)

(58) Field of Classification Search
CPC ...... H02K 41/02; H02K 41/03; H02K 41/031; H02K 1/00
USPC ............. 310/12.01–12.24, 15, 25, 12.33, 310/154.03–154.16
See application file for complete search history.

(56) References Cited

U.S. PATENT DOCUMENTS

| | | | | |
|---|---|---|---|---|
| 5,757,091 A * | 5/1998 | Sogabe | ............... | H02K 41/031 310/12.02 |
| 5,952,742 A * | 9/1999 | Stoiber | ............... | H02K 1/17 310/12.18 |
| 6,848,164 B2 * | 2/2005 | Jung | ............... | H02K 1/27 29/596 |
| 6,930,413 B2 * | 8/2005 | Marzano | ............... | H02K 41/031 310/12.18 |
| 7,042,118 B2 * | 5/2006 | McMullen | ............... | H02K 1/2733 310/12.24 |
| 7,304,407 B2 * | 12/2007 | Sanematsu | ............... | H02K 33/16 310/12.24 |
| 7,439,640 B2 * | 10/2008 | Takeuchi | ............... | H01F 7/066 310/12.22 |
| 7,586,217 B1 * | 9/2009 | Smith | ............... | H02K 41/03 310/12.24 |
| 2009/0026847 A1 * | 1/2009 | Kim | ............... | H02K 1/27 310/12.25 |

(Continued)

FOREIGN PATENT DOCUMENTS

JP H07329783 A * 12/1995

OTHER PUBLICATIONS

JPH07329783A Machine English Translation.*

*Primary Examiner* — Mang Tin Bik Lian
*Assistant Examiner* — Maged M Almawri
(74) *Attorney, Agent, or Firm* — Ostrolenk Faber LLP (57) ABSTRACT

A magnet assembly for a linear motor, the magnet assembly including one or more permanent magnets, a mounting plate having a mounting portion that is configured for arranging and mounting the one or more permanent magnets along a direction of elongation of the mounting plate, and at least one elongate member that extends at least partially through the mounting plate between a first end and second end thereof, the at least one elongate member extending at least partially through the or each magnet for fixing the or each magnet with respect to the mounting plate.

19 Claims, 5 Drawing Sheets

(56) References Cited

U.S. PATENT DOCUMENTS

| | | | |
|---|---|---|---|
| 2009/0051227 A1* | 2/2009 | Kim | H02K 41/03 310/12.24 |
| 2011/0241449 A1* | 10/2011 | Aoyama | H02K 41/03 310/12.05 |
| 2011/0298308 A1* | 12/2011 | Aoyama | H02K 41/03 310/12.15 |
| 2012/0242173 A1* | 9/2012 | Hu | H02K 41/031 310/12.18 |
| 2013/0082545 A1* | 4/2013 | Goto | H02K 41/02 310/12.24 |
| 2013/0093264 A1* | 4/2013 | Aoyama | H02K 1/06 310/12.05 |
| 2015/0001969 A1* | 1/2015 | Aoyama | H02K 41/02 310/12.25 |
| 2015/0270767 A1* | 9/2015 | Kusaga | H02K 41/031 310/12.24 |
| 2017/0110955 A1* | 4/2017 | Gause | H02K 41/031 |

\* cited by examiner

MAGNET ASSEMBLY MOUNTING ARRANGEMENT FOR AN ELECTROMAGNETIC MOTOR

FIELD OF THE INVENTION

The present invention relates to a magnet assembly for an electromagnetic motor, and in one or more examples, to an improved magnet mounting arrangement for a linear motor.

BACKGROUND OF INVENTION

The reference in this specification to any prior publication (or information derived from it), or to any matter which is known, is not, and should not be taken as an acknowledgment or admission or any form of suggestion that the prior publication (or information derived from it) or known matter forms part of the common general knowledge in the field of endeavour to which this specification relates.

For conventional high force/torque constant electromagnetic motors, magnets are usually adhered to a flat plate, arcuate plate or cylinder fixture by epoxy or other adhesive. Alternatively, the magnets may be clamped by screws, bars, covers or the like in order to secure them. Typically, the magnets are subjected to shear stress in either horizontal or tangential directions depending on the fixture type and forces of attraction in the vertical or radial directions.

As the motors may bear heavy loads, the epoxy or adhesive bonds may break down due to applied stress or fatigue leading to the magnets becoming loose. Alternatively, as the magnets are often quite brittle, the magnets themselves may break or crack if secured by direct clamping by screw, bar or cover. This then leads to issues in performance and reliability. An additional drawback with the bar or cover clamping arrangement is that it requires space and often protrudes into the air gap between the magnets and coils of the motor. This in turn increases the motor size and decreases performance and efficiency.

It is generally desirable to overcome or ameliorate one or more of the above mentioned difficulties, or at least provide a useful alternative.

SUMMARY OF THE INVENTION

The present invention provides a magnet assembly for a linear motor, the magnet assembly including:
a) one or more permanent magnets;
b) a mounting plate having a mounting portion that is configured for arranging and mounting the one or more permanent magnets along a direction of elongation of the mounting plate; and,
c) at least one elongate member that extends at least partially through the mounting plate between a first end and second end thereof, the at least one elongate member extending at least partially through the or each magnet for fixing the or each magnet with respect to the mounting plate.

Typically, the mounting portion further includes a plurality of recesses that are spaced apart along the direction of elongation of the mounting plate, each recess being configured for receiving one permanent magnet.

Typically, the mounting plate includes one or more partitions that separate respective recesses and that span across the mounting plate transversely to the direction of elongation of the mounting plate between opposing side walls thereof, each partition including at least one aperture having an axis parallel to the direction of elongation of the mounting plate.

Typically, the or each magnet includes at least one aperture configured such that the or each aperture of the magnet is collinear with the or each aperture in the or each partition when the magnets are arranged within the mounting plate.

Typically, the at least one elongate member extends through the respective apertures in the mounting plate and the or each magnet.

Typically, the or each elongate member is locally biased and deformed about opposing sides of the or each magnet by fastening elements inserted into the partitions from a top of the mounting plate.

Typically, the fastening elements are set or grub screws.

Typically, the or each magnet includes grooved portions in opposing end walls thereof and the mounting plate includes complementary recessed portions formed in opposing side walls of the mounting plate, the respective grooved and recessed portions cooperating, in use, to define a channel for receiving the or each elongate member therein.

Typically, the channel is circular or rectangular in cross section.

Typically, the or each elongate member is locally biased and deformed about opposing ends of one or more magnets by fastening elements inserted into the mounting plate.

Typically, the fastening elements are inserted from the top of the mounting plate to exert a generally downward pressure onto the elongate members.

Typically, the fastening elements are flat head screws.

Typically, the fastening elements are inserted into side walls of the mounting plate to exert a generally lateral pressure onto the elongate members.

Typically, the fastening elements are set or grub screws.

Typically, an outer surface of the or each elongate element is at least partially coated with an adhesive used to adhere the or each elongate element in the channel.

Typically, the or each elongate element is one of:
a) a tube;
b) a rod; and,
c) a wire.

Typically, the or each elongate element has a cross section that is circular or rectangular.

Typically, the or each magnet is further adhered to the mounting portion of the mounting by an adhesive.

In another broad form, the present invention seeks to provide a linear motor including the above-described magnet assembly.

The present invention also provides a mounting plate for holding a row of permanent magnets for use in a linear motor, the mounting plate including a rectangular body having a mounting portion that is configured for arranging and mounting the row of permanent magnets along a direction of elongation of the mounting plate and wherein, in use, the mounting plate is adapted to receive at least one elongate member that extends at least partially through the mounting plate between a first end and a second end thereof, the at least one elongate member extending at least partially through the row of magnets for fixing the row of magnets with respect to the mounting plate.

It will be appreciated that the broad forms of the invention and their respective features can be used in conjunction, interchangeably and/or independently, and reference to separate broad forms is not intended to be limiting.

BRIEF DESCRIPTION OF THE DRAWINGS

Preferred embodiments of the invention are hereafter described, by way of non limiting example, with reference to the accompanying drawings, in which:—

DETAILED DESCRIPTION OF THE PREFERRED EMBODIMENTS

Figure 1A:
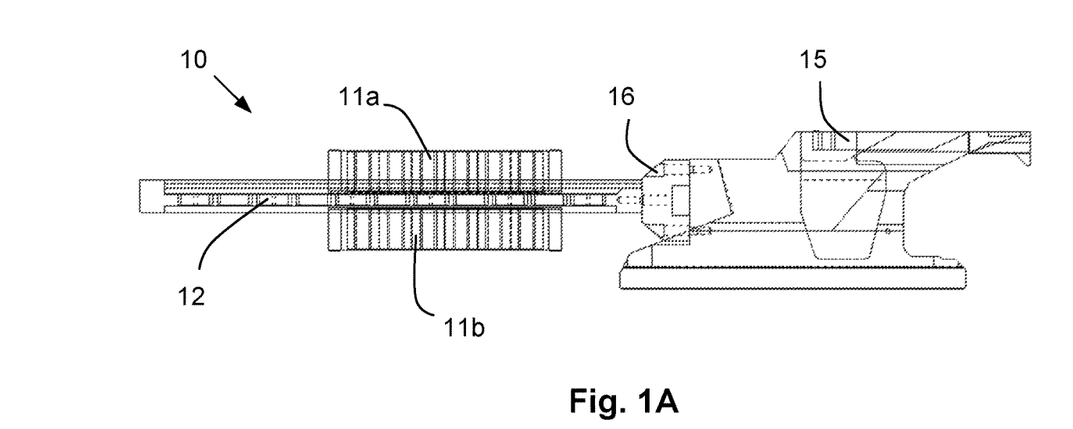
FIG. 1A is a side view of an example of a prior art arrangement of a linear motor connected to a payload.
Figure 1B:
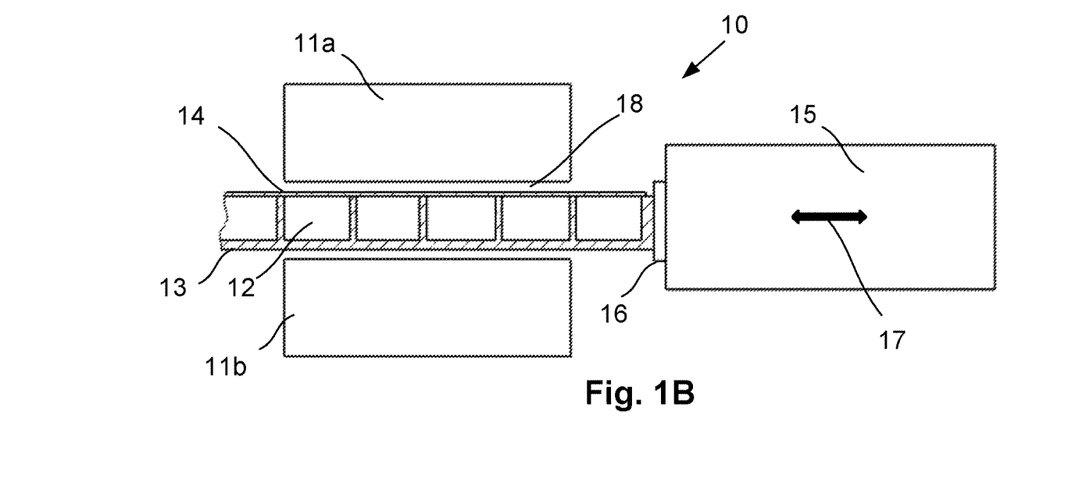
FIG. 1B is a schematic side view of the arrangement shown in FIG. 1A.

Referring now to FIGS. 1A and 1B, there is shown a linear motor 10 that includes stationary coils 11a, 11b wound around respective magnetic cores (such as iron cores). A magnet assembly comprising a row of permanent magnets 12 held in a fixture 13 such as a bracket or plate having a cover 14 is positioned between the stationary coils 11a, 11b. The magnets 12 have alternative North-South polarity. The magnet assembly is movable with respect to the coils. In this regard, the movement is translational or rectilinear motion in a horizontal direction 17.

The magnet assembly is attached to a movable payload 15 via a connector 16 such that the magnets 12, magnet bracket 13, connector 16 and payload 15 all move together in horizontal direction 17, driven by the magnetic force generated by the motor. In this regard, it will be appreciated that the stationary coils 11a, 11b consist of windings which conduct a current that interacts with the magnetic flux density generated by the permanent magnets so as to generate the axial thrust force. As shown in FIG. 1B, there is an air gap or clearance 18 between the magnet assembly and the coils. The magnetic force constant is inversely proportional to the air gap 18. In order to generate maximum force it is therefore necessary to minimise the air gap.

Figure 2A:
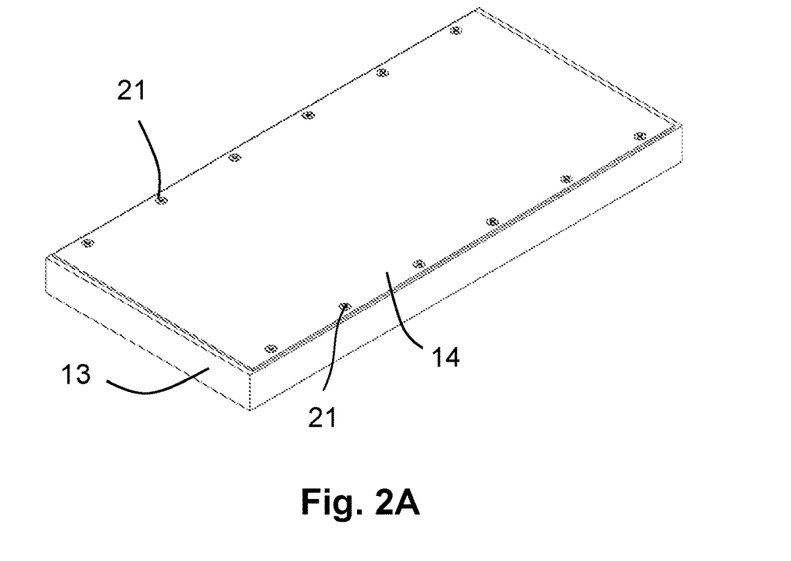
FIG. 2A is a perspective view of an example of a prior art magnet assembly for the linear motor of FIG. 1A.
Figure 2B:
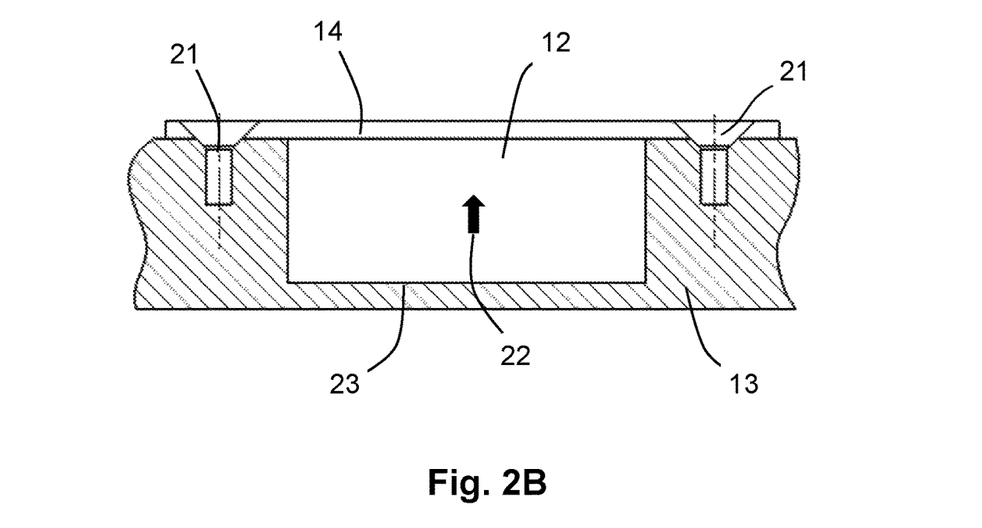
FIG. 2B is a cross sectional view of a magnet mounting arrangement used in the prior art magnet assembly of FIG. 2A.

In prior art magnet assemblies such as that shown in FIGS. 2A and 2B, the row of permanent magnets 12 are adhered into recesses or slots formed in the mounting bracket 13 by epoxy or other suitable adhesive 23. The magnets 12 are attracted to the magnetic core of coil 11a as shown by arrow 22. In order to provide proper fixture to the magnets 12, a cover 14 is placed on top of the magnets 12 and fastened to the mounting bracket 13 by screws 21, such as flat head screws or the like. The problem with this arrangement is that the cover 14 has a thickness which protrudes into the air gap 18 between the coil 11a and magnet assembly thereby reducing the magnetic force constant and performance of the motor.

An example of a magnet assembly 100 for a linear motor having an improved magnet mounting arrangement will now be described with reference to FIGS. 3A and 3B.

In this example, the magnet assembly 100 includes one or more permanent magnets 120. The permanent magnets 120 are generally arranged in a row with alternate magnets having opposing polarities. The magnet assembly 100 further includes a mounting plate 110 having a mounting portion (for example one or more recesses or slots) that is configured for arranging and mounting the one or more permanent magnets 120 along a direction of elongation of the mounting plate 110. At least one elongate member 130 extends at least partially through the mounting plate 110 between a first end 113 and second end 114 thereof, the at least one elongate member 130 extending at least partially through the or each magnet 120 for fixing the or each magnet 120 with respect to the mounting plate 110.

In this way, the at least one elongate member 130 acts to restrain each magnet 120 from movement normal to the mounting plate 110. Advantageously, this arrangement removes the need for a cover above the magnets as used in the prior art which reduces the size of the magnet assembly. This in turn reduces the air gap between the magnets and top coil which increases the magnetic force constant and may also improve the magnetic field transformation efficiency without changing the magnetic field distribution. The elongate members extending through the mounting plate may further act to stiffen the mounting plate and increase rigidity of the mounting plate.

A number of further examples will now be described.

In one example, the mounting portion of the mounting plate includes a plurality of recesses that are spaced apart along the direction of elongation of the mounting plate, each recess being configured for receiving one permanent magnet. Alternatively, the mounting plate may have a single recess that extends substantially along the direction of elongation of the plate for receiving the one or more permanent magnets therein. In such an arrangement, the magnets may be arranged in the recess and then epoxy or other suitable adhesive may be filled in around them.

In one example, the mounting plate includes one or more partitions that separate respective recesses and that span across the mounting plate transversely to the direction of elongation of the mounting plate between opposing side walls thereof, each partition including at least one aperture having an axis parallel to the direction of elongation of the mounting plate. Any suitable number of apertures may be used and in one particular example, a pair of spaced apart apertures are formed in each partition.

In this example, the or each magnet includes at least one aperture configured such that the or each aperture of the magnet is collinear with the or each aperture in the or each partition when the magnets are arranged within the mounting plate. In this way, the respective apertures cooperate to define channels through the magnet assembly for receiving the at least one elongate member therethrough.

In one example, the or each elongate member is locally biased and deformed about opposing sides of the or each magnet by fastening elements inserted into the partitions from a top of the mounting plate. Typically, the fastening elements are set or grub screws which are tightened as necessary to apply sufficient clamping force to the elongate members.

In other examples, the or each magnet includes grooved portions in opposing end walls thereof and the mounting plate includes complementary recessed portions formed in opposing side walls of the mounting plate, the respective grooved and recessed portions cooperating, in use, to define a channel for receiving the or each elongate member therein.

Typically, the channel is either circular or rectangular for respectively receiving circular or rectangular elongate members. In this regard, it is to be appreciated that the elongate members may include any suitable members including for example tubes, rods or wire.

In the above example, the or each elongate member is locally biased and deformed about opposing ends of one or more magnets by fastening elements inserted into the mounting plate. In this regard, the fastening members may be flat head screws that may be inserted from a top of the mounting plate to exert a generally downward pressure onto the elongate members. Alternatively, the fastening members may be set (grub) screws that may be inserted into side walls of the mounting plate to exert a generally lateral pressure onto the elongate members.

In another example, the magnets may be fully fixed without the use of fastening elements at all. In this example, an outer surface of the or each elongate element is at least partially coated with an adhesive used to adhere the or each elongate element in the channel.

Typically, the or each magnet is also adhered in a recess of the mounting plate by an adhesive such as epoxy.

In another broad form, there is provided a mounting plate for holding a row of permanent magnets for use in a linear motor, the mounting plate including a rectangular body having a mounting portion that is configured for arranging and mounting the row of permanent magnets along a direction of elongation of the mounting plate and wherein, in use, the mounting plate is adapted to receive at least one elongate member that extends at least partially through the mounting plate between a first end and a second end thereof, the at least one elongate member extending at least partially through the row of magnets for fixing the row of magnets with respect to the mounting plate.

Figure 3A:
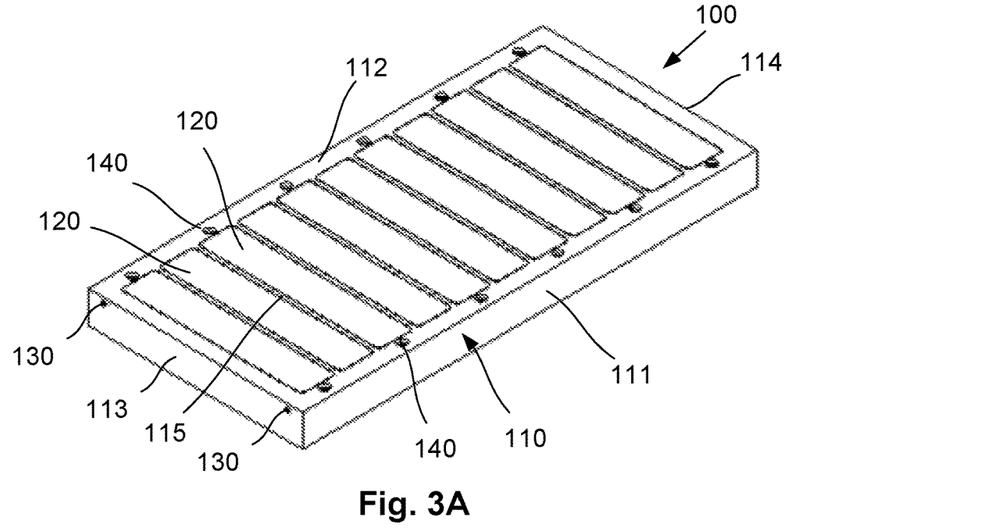
FIG. 3A is a perspective view of an example of a magnet assembly for a linear motor.
Figure 3B:
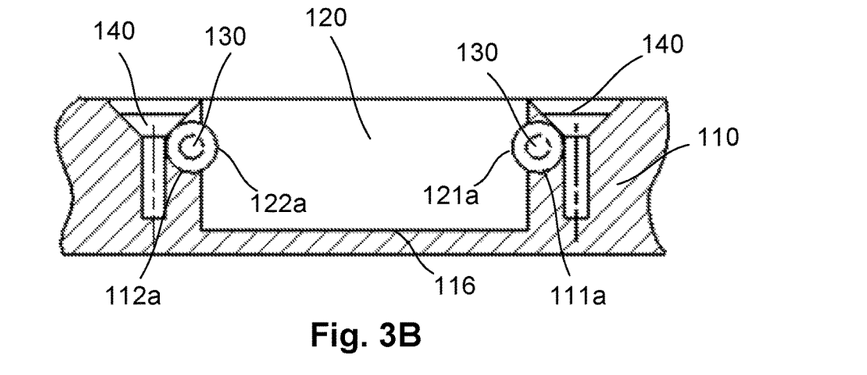
FIG. 3B is a cross sectional view of a magnet mounting arrangement used in the magnet assembly of FIG. 3A.

As particularly shown in FIGS. 3A and 3B, the magnet assembly 100 includes a mounting plate 110 having a generally rectangular structure with a mounting portion for arranging and mounting one or more permanent magnets 120, the mounting portion including a plurality of recesses 116 spaced apart in a direction of elongation of the mounting plate 110. Each recess 116 is separated by a divider or partition 115 that extends across the mounting plate 110 between opposing side walls 111, 112 transversely to a direction of elongation of the mounting plate 110. The mounting plate 110 further includes opposing end walls 113, 114.

A plurality of permanent magnets 120 are located in the respective recesses 116 of the mounting plate 110. The magnets 120 are typically arranged such that alternating magnets have opposing polarities. As shown most clearly in FIG. 3B, opposing ends of each magnet 120 have an arcuate groove 121a, 122a formed therein. The mounting plate 110 is also configured such that opposing side walls 111, 112 have complementary arcuate recesses 111a, 112a formed therein that are aligned with grooves 121a, 122a when the magnets 120 are located in their respective recesses 116. It will be appreciated therefore that in this arrangement, arcuate recesses and grooves 111a, 121a and 112a, 122a cooperate to form circular channels.

In use, elongate members 130 are inserted into the circular channels between the first and second end walls 113, 114 of the mounting plate 110 such that they engage with both the magnets 120 and mounting plate 110. In this way, the magnets 120 are at least partially restrained from movement normal to the mounting plate 110. The elongate members 130 are typically inserted into the channels via apertures formed through at least one end of the mounting plate 110. Any suitable elongate member 130 may be used including for example tubes, rods, wire and the like. In order to further restrain and fix the magnets 120 with respect to the mounting plate 110, fastening elements 140 (such as flat head screws) may be used to exert pressure onto at least part of the elongate members 130 causing them to deform. In the example shown in FIG. 3B, screws 140 are screwed down from the top of the mounting plate 110 so as to bias the elongate members 130 against the magnets 120. The screws 140 may be spaced apart along the top of the mounting plate 110 in the direction of elongation thereof about opposing sides of the row of magnets, proximate the side walls 111, 112 of the mounting plate 110. Each magnet 120 is then fully fixed under the said biasing pressure.

Figure 4:
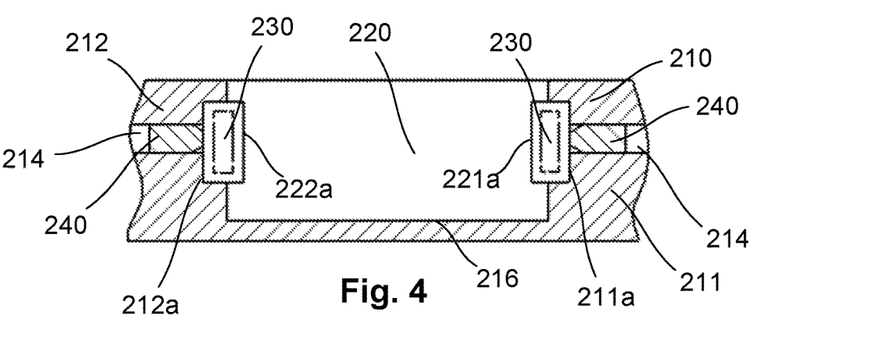
FIG. 4 is a cross section view of another example of a magnet mounting arrangement.

Referring now to FIG. 4, there is shown a further example of a magnet assembly 200 for a linear motor having an improved magnet mounting arrangement.

In this example, each opposing end of each magnet 220 has a rectangular groove 221a, 222a formed therein. The mounting plate 210 is also configured such that opposing side walls 211, 212 have complementary rectangular recesses 211a, 212a formed therein that are aligned with the rectangular grooves 221a, 222a when the magnets 220 are located in their respective recesses 216 in the mounting plate 210. It will be appreciated therefore that in this arrangement, the rectangular recesses and grooves 211a, 221a and 212a, 222a cooperate to form rectangular channels.

In use, elongate members 230 are inserted into the rectangular channels between the first and second end walls of the mounting plate 210 such that they engage with both the magnets 220 and mounting plate 210. In this way, the magnets 220 are at least partially restrained from movement normal to the mounting plate 210. The elongate members 230 are typically inserted into the channels via apertures formed through at least one end of the mounting plate 110. Any suitable elongate member 230 may be used including for example square or rectangular tubes, rods, wire and the like. In order to further restrain and fix the magnets 220 with respect to the mounting plate 210, fastening elements 240 (such as set or grub screws) may be used to exert pressure onto at least part of the elongate members 230 causing them to deform. In the example shown in FIG. 4, screws 240 are screwed laterally into the elongate members 230 through apertures 214 formed in the opposing side walls 211, 212 of the mounting plate 210. In this way, the elongate members 230 are biased laterally against the magnets 220 in order to fully fix the magnets 220 with respect to the mounting plate 210. The screws 140 may be spaced apart along the opposing sides of the mounting plate 210 in the direction of elongation thereof.

In the above described examples, the magnets are fixed with respect to the mounting plate by screws which exert pressure onto the elongate members causing them to deform and thereby restrain the magnets. In this way, the magnets are able to be fixed without the use of covers which maximises the air gap and overall electromagnetic performance of the motor.

Figure 5A:
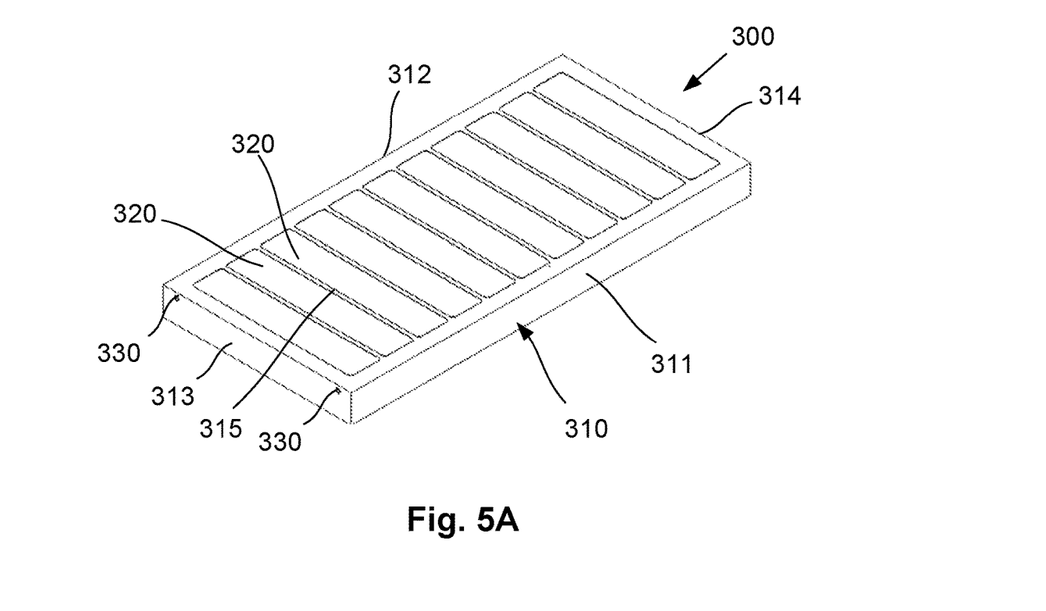
FIG. 5A is a perspective view of another example of a magnet assembly for a linear motor.
Figure 5B:
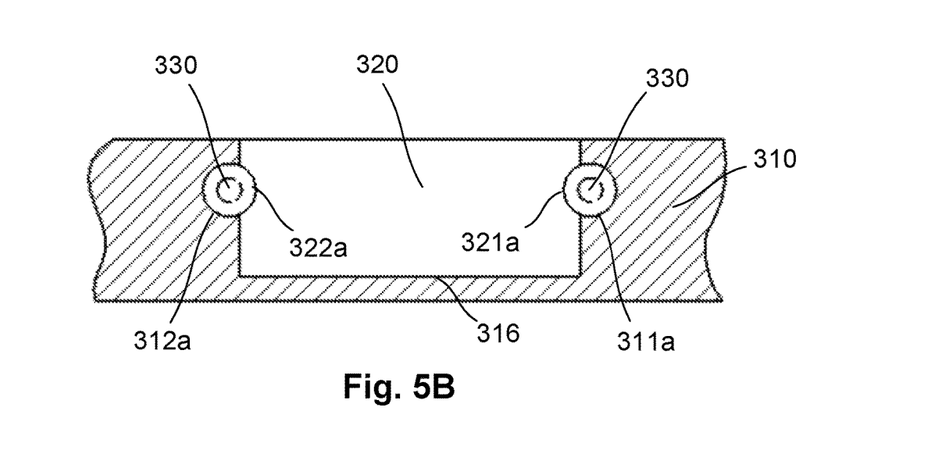
FIG. 5B is a cross sectional view of a magnet mounting arrangement used in the magnet assembly of FIG. 5A.

Referring now to FIGS. 5A and 5B, there is shown another example of a magnet assembly 300 for a linear motor having an improved magnet mounting arrangement.

In this example, the magnet assembly 300 includes a mounting plate 310 having a generally rectangular structure with a plurality of recesses 316 spaced apart in a direction of elongation of the mounting plate 310. Each recess 316 is separated by a divider or partition 315 that spans across the mounting plate 310 between opposing side walls 311, 312 transversely to a direction of elongation of the mounting plate 310. The mounting plate 310 further includes opposing end walls 313, 314.

A plurality of permanent magnets 320 are located in the respective recesses 316 of the mounting plate 310. The magnets 320 are typically arranged such that alternate magnets have opposing polarities. As shown most clearly in FIG. 5B, opposing ends of each magnet 320 have an arcuate groove 321a, 322a formed therein. The mounting plate 310 is also configured such that opposing side walls 311, 312 have complementary arcuate recesses 311a, 312a formed therein that are aligned with the grooves 321a, 322a when the magnets 320 are located in their respective recesses 316. It will be appreciated therefore that in this arrangement, arcuate recesses and grooves 311a, 321a and 312a, 322a cooperate to form circular channels. In other examples, as previously described the recesses or grooves may be rectangular instead of circular.

In use, elongate members 330 are inserted into the channels between the first and second end walls 313, 315 of the mounting plate 310 such that they engage with both the magnets 320 and mounting plate 310. In this way, the magnets 320 are at least partially restrained from movement normal to the mounting plate 310. The elongate members 330 are typically inserted into the channels via apertures formed through at least one end of the mounting plate 310. Any suitable elongate member 330 may be used including for example tubes, rods, wire and the like. In this example, an epoxy or adhesive is applied to the outer surface of the elongate members 330 such that when inserted into the channels they become adhered to both the magnets 320 and mounting plate 310. In this way, the magnets 320 are fixed with respect to the mounting plate 310 without the need for screws or other fasteners as described in the previous examples.

This arrangement therefore eliminates the need for screws or other fasteners which reduces assembly time and inventory as well as the overall mass of the magnet assembly. Without screws, screw holes are also avoided, thereby improving the stiffness of the mounting plate.

Figure 6A:
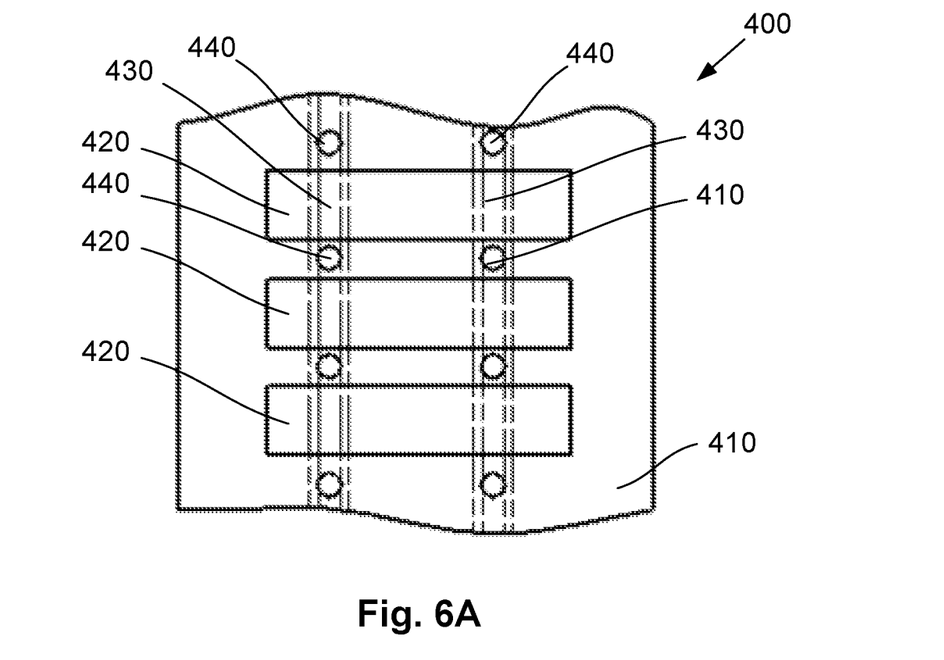
FIG. 6A is a partial top view of a further example of a magnet assembly for a linear motor; and, FIG. 6B is a cross sectional view of a magnet mounting arrangement used in the magnet assembly of FIG. 6A.
Figure 6B:
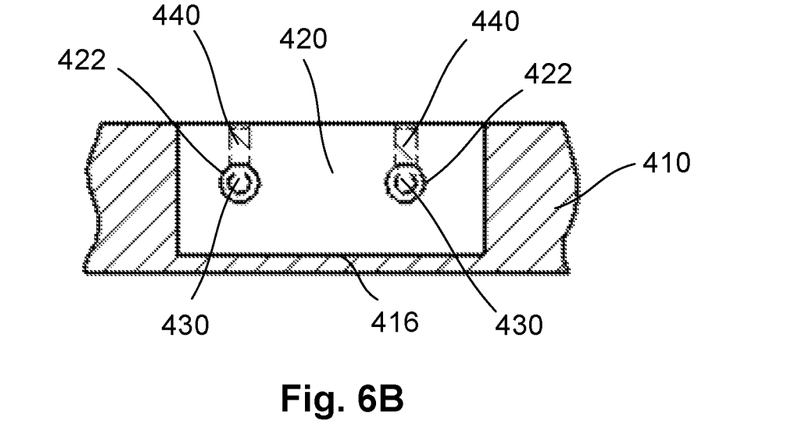

Referring now to FIGS. 6A and 6B, there is shown a further example of a magnet assembly 400 for a linear motor having an improved magnet mounting arrangement.

In this arrangement, a plurality of permanent magnets 420 are positioned in spaced apart recesses 416 of a mounting plate 410, substantially as previously described. Each magnet 420 includes a pair of apertures 422 therethrough which extend in the direction of elongation of the mounting plate 410. The mounting plate 410 includes corresponding apertures in the end walls thereof and partitions between recesses 416 which axially align with the apertures 422 in the magnets 420 when the magnets 420 are mounted into the mounting plate 410.

In use, elongate members 430 are inserted through the apertures formed in the mounting plate 410 and magnets 420 so as to extend between the opposing ends of the mounting plate 410 through each magnet 420. In this way, the magnets 420 are at least partially restrained from movement normal to the mounting plate. Any suitable elongate member 430 may be used including for example tubes, rods, wire and the like. In order to fully fix the magnets 420 with respect to the mounting plate 410, fastening elements 440 (such as set or grub screws) may be used to exert pressure onto at least part of the elongate members 430 causing them to deform. In the example shown in FIG. 6B, screws 440 are screwed down from the top of the mounting plate 410 through the partitions between the recesses 416 and about opposing sides of each magnet 420. This in turn, locally biases and deforms the elongate members 430 about the opposing sides of each magnet 420 which fixes the magnets 420 securely in place.

Typically, in one or more of the examples described, each magnet will further be adhered into a recess of the mounting plate by epoxy or other suitable adhesive.

From the foregoing description, it will be appreciated that in one aspect, the present invention provides a magnet assembly that removes the need for a cover above the magnets as used in the prior art which enables the overall size of the magnet assembly to be reduced. This in turn reduces the air gap between the magnets and top coil which increases the magnetic force constant and may also improve the magnetic field transformation efficiency without changing the magnetic field distribution. The elongate members extending through the mounting plate may further act to stiffen the mounting plate and increase rigidity of the mounting plate. In some examples, the magnets may be fully fixed to the mounting plate without requiring the use of any screws or other fastening elements, thereby reducing assembly time and weight of the assembly while improving the overall stiffness thereof.

Throughout this specification and claims which follow, unless the context requires otherwise, the word "comprise", and variations such as "comprises" or "comprising", will be understood to imply the inclusion of a stated integer or group of integers or steps but not the exclusion of any other integer or group of integers.

Persons skilled in the art will appreciate that numerous variations and modifications will become apparent. All such variations and modifications which become apparent to persons skilled in the art, should be considered to fall within the spirit and scope that the invention broadly appearing before described.

The invention claimed is:

1. A magnet assembly for a linear motor, the magnet assembly including:
    (a) one or more permanent magnets;
    (b) a mounting plate comprising a mounting portion that is configured for arranging and mounting the one or more permanent magnets along a direction of elongation of the mounting plate; and
    (c) at least one elongate member that extends at least partially through the mounting plate between a first end and a second end thereof, the at least one elongate member extending at least partially through the one or more permanent magnets for fixing the one or more permanent magnets with respect to the mounting plate,
    wherein the one or more permanent magnets includes grooved portions in opposing end walls thereof, and
    the mounting plate includes complementary recessed portions formed in opposing side walls of the mounting plate,
    wherein the respective grooved and recessed portions cooperate, in use, to define a channel for receiving the at least one elongate member therein.

2. The magnet assembly according to claim 1, wherein the channel is circular or rectangular in cross section.

3. The magnet assembly according to claim 1, wherein an outer surface of the at least one elongate member is at least partially coated with an adhesive used to adhere the at least one elongate member in the channel.

4. The magnet assembly according to claim 1, wherein the one or more permanent magnets is further adhered to the mounting portion of the mounting plate by an adhesive.

5. A linear motor including the magnet assembly according to claim 1.

6. The magnet assembly according to claim 1, wherein the at least one elongate member is one of:
   (a) a tube;
   (b) a rod; and
   (c) a wire.

7. The magnet assembly according to claim 6, wherein the at least one elongate member has a cross section that is circular or rectangular.

8. The magnet assembly according to claim 1, wherein the mounting portion further includes a plurality of recesses that are spaced apart along the direction of elongation of the mounting plate, each recess being configured for receiving one permanent magnet.

9. The magnet assembly according to claim 8, wherein the mounting plate includes one or more partitions that separate respective recesses and that span across the mounting plate transversely to the direction of elongation of the mounting plate between opposing side walls thereof, each partition including at least one aperture having an axis parallel to the direction of elongation of the mounting plate.

10. The magnet assembly according to claim 9, wherein the or each magnet includes at least one aperture configured such that the or each aperture of the magnet is collinear with the or each aperture in the or each partition when the magnets are arranged within the mounting plate.

11. The magnet assembly according to claim 10, wherein the at least one elongate member extends through the respective apertures in the mounting plate and the or each magnet.

12. The magnet assembly according to claim 11, wherein the or each elongate member is locally biased and deformed about opposing sides of the or each magnet by fastening elements inserted into the partitions from a top of the mounting plate.

13. The magnet assembly according to claim 12, wherein the fastening elements are set or grub screws.

14. The magnet assembly according to claim 1, wherein the at least one elongate member is locally biased and deformed about opposing ends of one or more magnets by fastening elements inserted into the mounting plate.

15. The magnet assembly according to claim 14, wherein the fastening elements are inserted from the top of the mounting plate to exert a generally downward pressure onto the elongate members.

16. The magnet assembly according to claim 15, wherein the fastening elements are flat head screws.

17. The magnet assembly according to claim 14, wherein the fastening elements are inserted into side walls of the mounting plate to exert a generally lateral pressure onto the elongate members.

18. The magnet assembly according to claim 17, wherein the fastening elements are set or grub screws.

19. A mounting plate for holding a row of permanent magnets for use in a linear motor, the mounting plate including:
   a rectangular body comprising a mounting portion that is configured for arranging and mounting the row of permanent magnets along a direction of elongation of the mounting plat,
   wherein, in use, the mounting plate is adapted to receive at least one elongate member that extends at least partially through the mounting plate between a first end and a second end thereof, the at least one elongate member extending at least partially through the row of magnets for fixing the row of magnets with respect to the mounting plat,
   wherein the one or more permanent magnets includes grooved portions in opposing end walls thereof, and
   the mounting plate includes complementary recessed portions formed in opposing side walls of the mounting plate,
   wherein the respective grooved and recessed portions cooperate, in use, to define a channel for receiving the at least one elongate member therein.

* * * * *